(No Model.)
W. N. BARROWS.
Steam Jacket Kettle.
No. 233,189.  Patented Oct. 12, 1880.
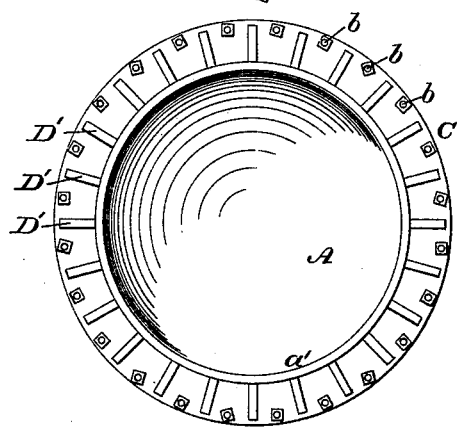
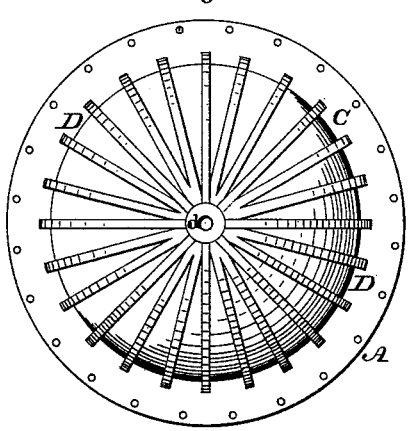
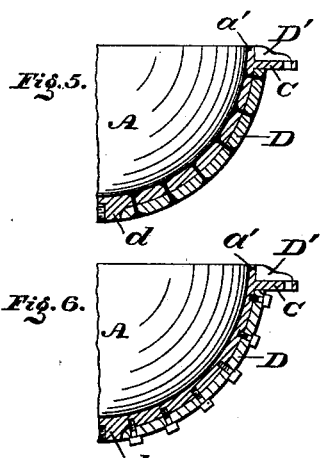
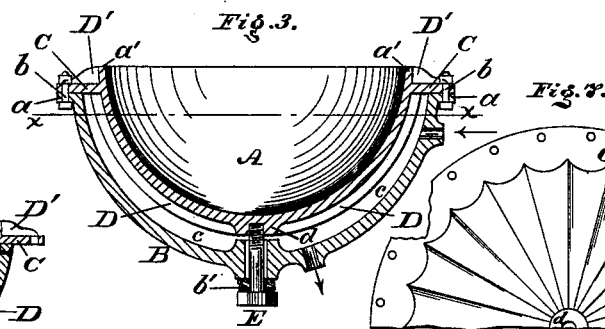
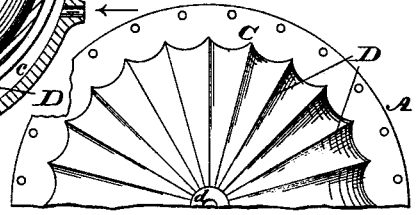
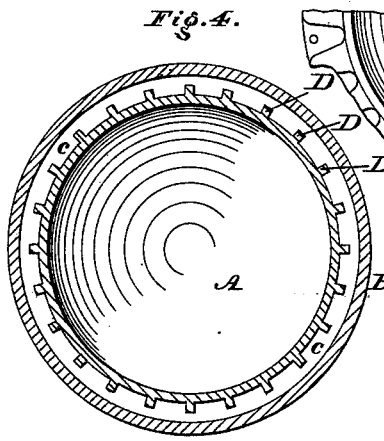
Witnesses:
A. P. Grant,
W. F. Kircher
Inventor:
Wm. N. Barrows,
by John A. Wiedersheim
ATTORNEY.
N. PETERS, PHOTO-LITHOGRAPHER, WASHINGTON, D. C.

UNITED STATES PATENT OFFICE.

WILLIAM N. BARROWS, OF PHILADELPHIA, PENNSYLVANIA.

STEAM-JACKET KETTLE.

SPECIFICATION forming part of Letters Patent No. 233,189, dated October 12, 1880.

Application filed April 22, 1880. (No model.)

*To all whom it may concern:*

Be it known that I, WILLIAM N. BARROWS, a citizen of the United States, residing in the city and county of Philadelphia, State of Pennsylvania, have invented a new and useful Improvement in Steam-Jacket Kettles, which improvement is fully set forth in the following specification and accompanying drawings, in which—

Figure 1 is a top or plan view of the kettle embodying my invention. Fig. 2 is a view of the under side thereof. Fig. 3 is a central vertical section of Fig. 1. Fig. 4 is a horizontal section in line $x\ x$, Fig. 3. Fig. 5 is a modification, showing the ribs of the kettle riveted in position. Fig. 6 is a modification, showing the ribs screwed or bolted in position. Fig. 7 is a modification showing the outer surface of the kettle scalloped or corrugated in lieu of the ribs. Fig. 8 is a modification showing scallops or corrugations in lieu of the top ribs.

Similar letters of reference indicate corresponding parts in the several figures.

My invention relates to a jacket-kettle the kettle of which is exteriorly ribbed, scalloped, or corrugated, the kettle thus possessing great strength, and adapted to be made thin and light, thereby enabling the heating or cooking to be quickly and economically accomplished, other advantages being presented, as will be hereinafter set forth.

Referring to the drawings, A represents the kettle and B the jacket. The kettle A is formed of wrought or cast iron or other metal, and has at top a flange, C, which rests on the flanged edge $a$ of the jacket B, and closes the top of the space between the kettle and jacket, the securing-bolts $b$ of the two parts A B passing through the flanges C $a$.

On the outer surface of the kettle A are a series of ribs, D, which radiate from the center of the bottom of the kettle to the top flange, C, thereof, and on the upper face of said flange are ribs D', which connect the flange and vertical rim $a'$ of the kettle projecting above the flange.

E represents a stay-bolt, which is passed freely through the bottom of the jacket B, and its threaded end screws into the bottom of the kettle A. Packing $b'$ is interposed between the head of the bolt E and outer face of the jacket B, in order to close the joint at the bottom of the kettle and prevent leakage thereat.

The ribs D D' in the present case are cast with and upon the kettle, but they may be riveted, bolted, or otherwise secured to the frame; or, if desired, the kettle may be corrugated, scalloped, or otherwise equivalently constructed.

It will be seen that the ribs D abut against the flange C, and, in conjunction with the ribs D', form a series of arches extending over the exterior surface of the kettle C, the boss $d$ acting as the crown of the arch of the ribs D, thereby giving great strength with the least amount of weight and thickness. It will also be noticed that the diameter of the kettle is considerably less than that of the jacket, so that a steam-receiving space, $c$, exists between the two parts, the shape of each part being hemispherical.

When the kettle is in service the steam entering the space $c$ serves to heat or boil the contents of the kettle, the inlet and outlet of steam being clearly shown in Fig. 3.

The kettle A is formed of comparatively thin or light metal, and the ribs D strengthen the main portion thereof so as to withstand the pressure of steam. Furthermore, the flange C, by which the kettle is suspended and bolted to the jacket, is also vastly strengthened in order to endure the steam-pressure to which it is subjected. By these provisions, also, the weight of the device is considerably reduced, and the heat created in the space $c$ radiates quickly through the thin metal of the kettle, thus accomplishing the heating or boiling in less time and economizing steam and fuel.

The stay-bolt E serves to connect the bottoms of the kettle and jacket, and equalizes the pressure of steam on the two parts. The hemispherical form of the kettle is preferred, as it leaves an inner unbroken surface and facilitates stirring, cleaning, &c.

Having thus described my invention, what I claim as new, and desire to secure by Letters Patent, is—

1. The jacket-kettle provided with the strengthening-ribs D, substantially as and for the purpose set forth.

2. The jacket-kettle having a top flange, C, which is provided with strengthening-ribs D', substantially as and for the purpose set forth.

3. The jacket-kettle having ribs D, and a flange, C, with ribs D', substantially as and for the purpose set forth.

4. The jacket-kettle with ribs forming arches which extend over the exterior surface of kettle C, and boss d, acting as the crown of the arch, substantially as set forth.

5. The combination, with the ribbed kettle A and exterior kettle, B, of the connecting stay-bolt E, constructed and operating substantially as and for the purpose set forth.

WM. N. BARROWS.

Witnesses:
JOHN A. WIEDERSHEIM,
A. P. GRANT.